(12) United States Patent
Williams

(10) Patent No.: US 7,338,064 B1
(45) Date of Patent: Mar. 4, 2008

(54) PIVOTAL FOLD AWAY TRAILER HITCH MOUNT

(76) Inventor: James A. Williams, 4950 W. Highway 7, Sulphur, OK (US) 73086

( * ) Notice: Subject to any disclaimer, the term of this patent is extended or adjusted under 35 U.S.C. 154(b) by 149 days.

(21) Appl. No.: 11/222,427

(22) Filed: Sep. 8, 2005

(51) Int. Cl.
*B60D 1/54* (2006.01)

(52) U.S. Cl. .................... 280/491.3; 280/491.1

(58) Field of Classification Search ............ 280/491.3, 280/491.1, 498
See application file for complete search history.

(56) References Cited

U.S. PATENT DOCUMENTS

| | | | |
|---|---|---|---|
| 1,677,618 A * | 7/1928 | Clement .................. 280/408 |
| 2,576,383 A * | 11/1951 | Avery .................. 280/491.3 |
| 2,733,936 A * | 2/1956 | Tate .................. 280/491.3 |
| 3,117,805 A * | 1/1964 | Schoeffler .................. 280/491.3 |
| 3,565,461 A * | 2/1971 | Jones .................. 280/491.3 |
| 3,717,362 A | 2/1973 | Johnson |
| 3,751,072 A * | 8/1973 | Williams .................. 280/491.3 |
| 3,912,119 A * | 10/1975 | Hill et al. ................. 280/479.2 |
| 4,194,755 A * | 3/1980 | Youngblood ................ 280/402 |
| 4,951,957 A | 8/1990 | Gullickson |
| 4,978,134 A | 12/1990 | Dahl et al. |
| 5,624,129 A * | 4/1997 | Clark, Jr. ................. 280/478.1 |
| 6,149,181 A | 11/2000 | Biederman |
| 6,189,910 B1 | 2/2001 | Bartel |
| 6,595,540 B1 * | 7/2003 | MacKarvich ............ 280/491.3 |
| 6,712,381 B1 | 3/2004 | Moss |
| 6,957,826 B1 * | 10/2005 | MacKarvich ............ 280/491.3 |

* cited by examiner

*Primary Examiner*—Lesley D. Morris
*Assistant Examiner*—Maurice Williams
(74) *Attorney, Agent, or Firm*—Richard L. Miller

(57) ABSTRACT

A pivotal fold away trailer hitch mount which comprises a mounting plate secured to an underside of a frame of a motor vehicle and adjacent to a bumper of the motor vehicle. A hitch assembly is also provided. A mechanism is for pivotally connecting an inner end of the hitch assembly to a bottom surface of the mounting plate. The hitch assembly will swing from a towing position extending outwardly from the bumper of the motor vehicle to a stowed position extending under the frame of the motor vehicle away from the bumper. A mechanism is for retaining the hitch assembly in the towing position, while another mechanism is for holding the hitch assembly in the stowed position.

7 Claims, 3 Drawing Sheets

PIVOTAL FOLD AWAY TRAILER HITCH MOUNT

BACKGROUND OF THE INVENTION

1. Field of the Invention

The present invention relates to a trailer hitch, and more particularly, a pivotal fold away trailer hitch mount.

2. Description of the Prior Art

Numerous innovations for retractable towing hitches have been provided in the prior art that will be described. Even though these innovations may be suitable for the specific individual purposes to which they address, however, they differ from the present invention.

A FIRST EXAMPLE, U.S. Pat. No. 3,717,362 to Johnson teaches a trailer hitch for a vehicle that comprises a housing and a shaft member which are telescopically positioned relative to each other. A single or multiple ball trailer hitch is provided on the side or sides of the shaft adjacent its end, and cooperating mechanisms on the shaft and housing are provided for positioning them at longitudinally predetermined, spaced relationships, as well as permitting the ball trailer hitch to be positioned in any one of several rotated planes or in retracted position when not in use. Where a multiple ball trailer hitch is provided, the balls may be of different diameter.

A SECOND EXAMPLE, U.S. Pat. No. 4,951,957 to Gullickson teaches a wide-range hitch assembly which mounts on a towing vehicle, wherein a hitch ball can be pivoted in an arc and extended or retracted to simplify mating the hitch ball with a cooperating ball hitch fitted on a towed vehicle. The present invention includes a rectangular housing holding a conventional rectangular receiver tube mounted for pivotal movement within the interior of the housing. The receiver tube has pin receiving bores located in the top and bottom walls which bores may be coaxially aligned with corresponding bores in the top and bottom walls of the housing. A drawbar, slidably positioned within the receiver tube, has a bore therethrough which may be positioned in coaxial alignment with the bores through the receiver tube. A pin is used to automatically lock the receiver tube in a central, proper towing position as the receiver tube is centered for towing and then the drawbar retracted.

A THIRD EXAMPLE, U.S. Pat. No. 4,978,134 to Dahl, et al. teaches a foldable towing hitch attachable to a vehicle, having a pair of articulately attached arms extendable therefrom, one of the arms being foldable for collapsing both arms against the vehicle for storage, and further having a hitch bracket retaining the extended arms in a converged relationship and attachable to a second towed vehicle.

A FOURTH EXAMPLE, U.S. Pat. No. 6,149,181 to Biederman teaches a retractable hitch that stores away from view. The hitch consists of a hollow connector bar having an attachment end and a receiver end. The attachment end of the connector bar has an opening extending laterally through it. A mounting bar at the receiver end contains a storage chamber. A draw bar having a connector end and a hitch end fits within the connector bar. The connector end has an opening piercing it; and the hitch end has an end for connecting devices. A locking pin extends through the opening in the attachment end of the connector bar and the opening in the connector end of the draw bar. The locking pin locks in a first position for securing the draw bar in a first position for attaching devices and a second position for storing the connector bar within the storage chamber.

A FIFTH EXAMPLE, U.S. Pat. No. 6,189,910 B1 to Bartel teaches a trailer hitch that includes a cylindrical receiver perpendicularly mounted on a horizontal laterally extending tube attached to a vehicle. The receiver carries a slider movable between a first, retracted position substantially entirely disposed beneath the vehicle bumper and a second, extended position wherein the slider projects rearwardly of the vehicle bumper and carries a hitch ball for attachment to a towed object. A cam slot and cam follower are cooperatingly formed on the slider and the receiver, with the cam slot having angularly disposed ends for rotation of the slider between first and second angularly disposed position simultaneous with translation of the slider between first and second retracted and extended positions. A decorative cover overlays the exposed portions of the horizontal tube and the slider when the slider is in the retracted position. A movable member or members carried on the cover are movable to a position exposing access to the slider for movement of the slider between the extended and retracted positions.

A SIXTH EXAMPLE, U.S. Pat. No. 6,712,381 B1 to Moss teaches an apparatus for mounting a hitch to a vehicle. The apparatus may include a base connected to the vehicle. A mount, having a fastening portion and a main portion, may also be included. The fastening portion may receive a plurality of hitches thereon. The main portion may pivotably engage the base to provide a pivoting motion of the mount with respect to the base between a stowed position and a towing position distinct from the stowed position. A pivot may connect the main portion to the fastening portion to provide rotation therebetween. The apparatus may also include a hitch system having a first ball hitch monolithically formed to have a shank. A second hitch may be monolithically formed to have an aperture therein. The aperture of the second ball hitch may be shaped to axially receive and engage the shank of the first ball hitch.

It is apparent now that numerous innovations for retractable towing hitches have been provided in the prior art that adequate for various purposes. Furthermore, even though these innovations may be suitable for the specific individual purposes to which they address, accordingly, they would not be suitable for the purposes of the present invention as heretofore described.

SUMMARY OF THE INVENTION

AN OBJECT of the present invention is to provide a pivotal fold away trailer hitch mount that avoids the disadvantages of the prior art.

ANOTHER OBJECT of the present invention is to provide a pivotal fold away trailer hitch mount that is simple and inexpensive to manufacture.

STILL ANOTHER OBJECT of the present invention is to provide a pivotal fold away trailer hitch mount that is simple to use.

BRIEFLY STATED, STILL YET ANOTHER OBJECT of the present invention is to provide a pivotal fold away trailer hitch mount which comprises a mounting plate secured to an underside of a frame of a motor vehicle and adjacent to a bumper of the motor vehicle. A hitch assembly is also provided. A mechanism is for pivotally connecting an inner end of the hitch assembly to a bottom surface of the mounting plate. The hitch assembly will swing from a towing position extending outwardly from the bumper of the motor vehicle to a stowed position extending under the frame of the motor vehicle away from the bumper. A mechanism is for retaining the hitch assembly in the towing position, while another mechanism is for holding the hitch assembly in the stowed position.

The novel features which are considered characteristic of the present invention are set forth in the appended claims. The invention itself, however, both as to its construction and its method of operation, together with additional objects and advantages thereof, will be best understood from the following description of the specific embodiments when read and understood in connection with the accompanying drawing.

BRIEF DESCRIPTION OF THE DRAWING

The figures of the drawings are briefly described as follows.

Figure 1:
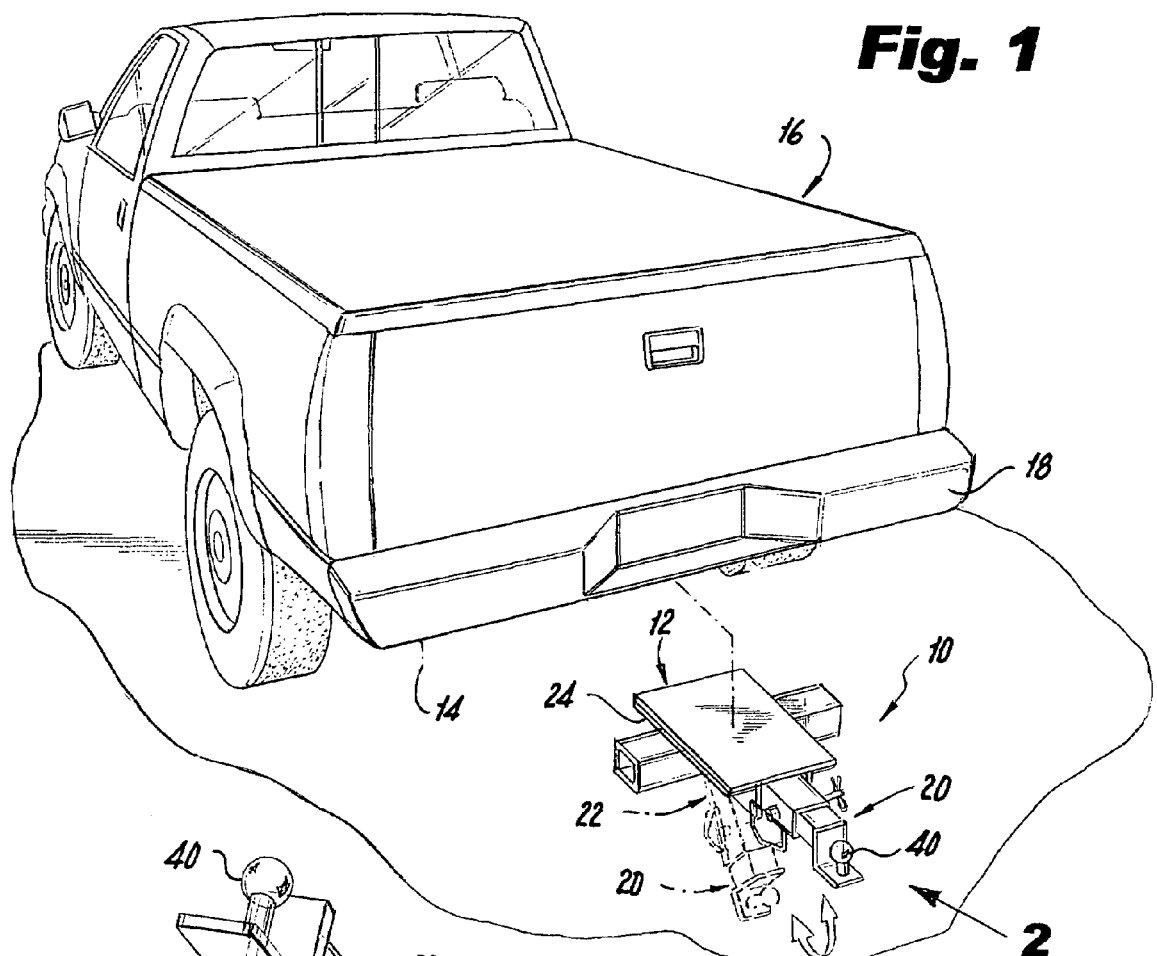
FIG. 1 is a diagrammatic top perspective view showing the present invention being a pivotal fold away trailer hitch mount exploded from the mounting place on a typical motor vehicle.

A MARSHALLING OF REFERENCE NUMERALS UTILIZED IN THE DRAWING 10 pivotal fold away trailer hitch mount
12 mounting plate of trailer hitch mount 10
14 frame of motor vehicle 16
16 motor vehicle
18 bumper of motor vehicle 16
20 hitch assembly of trailer hitch mount 10
22 pivotally connecting mechanism of trailer hitch mount 10
24 bottom surface of mounting plate 12
26 retaining mechanism of trailer hitch mount 10
28 holding mechanism of trailer hitch mount 10
30 hollow receiver arm of hitch assembly 20
32 shaft of hitch assembly 20
34 securing mechanism of hitch assembly 20
36 fitting of hitch assembly 20
38 outer end of shaft 22
40 trailer hitch towing ball of hitch assembly 20
42 bore in hollow receiver arm 30
44 outer end of receiver arm 30
46 bore in shaft 32
48 retainer pin of securing mechanism 34
50 transverse hole in retainer pin 48
52 first end of retainer pin 48
54 pull handle of retainer pin 48
56 second end of retainer pin 48
58 linchpin of securing mechanism 34
60 bracket assembly of pivotally connecting mechanism 22
62 hinge assembly of pivotally connecting mechanism 22
64 inner end of hollow receiver arm 30
66 L-shaped member of bracket assembly 60
68 first flange of L-shaped member 66
70 second flange of L-shaped member 66
72 pivot aperture in second flange 70
74 hinge sleeve of hinge assembly 62
76 cylindrical pivot member of hinge assembly 62
78 second bore in hollow receiver arm 30
80 bore in second flange 70
82 second retainer pin of retaining mechanism 26
84 transverse hole in second retainer pin 82
86 first end of second retainer pin 82
88 pull handle of second retainer pin 82
90 second end of second retainer pin 82
92 latch mechanism of the holding mechanism 28
94 L-shaped out-out area in first flange 70
96 U-shaped structure of latch mechanism 92
98 base wall of U-shaped structure 96
100 first side wall of U-shaped structure 96
101 second side wall of U-shaped structure 96
102 slot in side walls 100, 101
104 corner of base wall 98
106 edge of side wall 100
108 coil spring of latch mechanism 92
109 cam plate of latch mechanism 92
110 slot in cam plate 109
112 handle of latch mechanism 92
114 arm of handle 112
116 curved free end of arm 114
118 hole in arm 114
120 latch bar of latch mechanism 92
122 notched head of latch bar 120
124 outer end of latch bar 120
126 aperture in latch bar 120
128 inner end of latch bar 120
130 bolt of latch mechanism 92
132 nut of latch mechanism 92
134 compressible pad member of trailer hitch mount 10
136 hollow rectangular reinforcement member of trailer hitch mount 10
138 end of hollow rectangular reinforcement member

DETAILED DESCRIPTION OF THE PREFERRED EMBODIMENT

Figure 2:
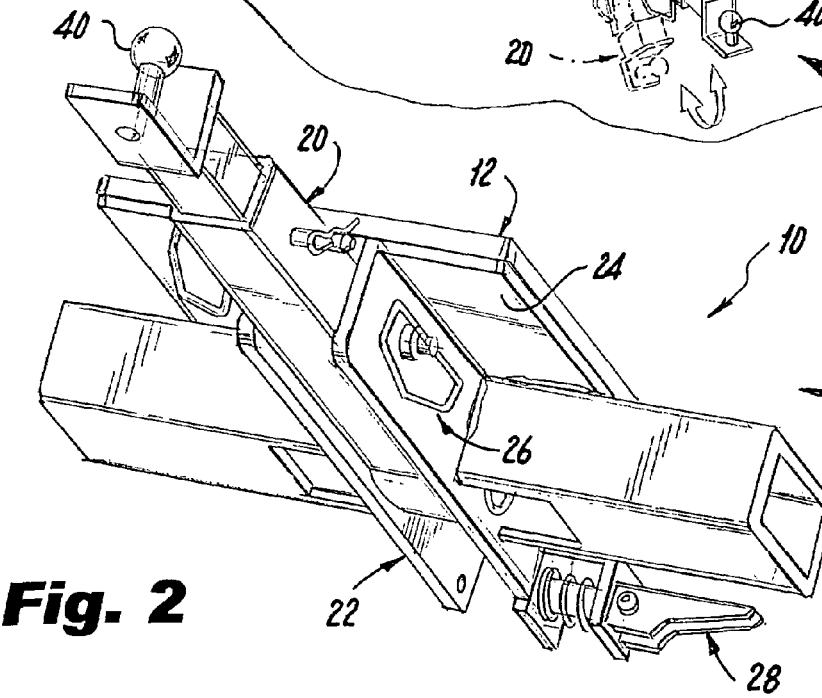
FIG. 2 is an enlarged diagrammatic bottom perspective view of the present invention per se, taken in the direction of arrow 2 in FIG. 1.

Referring now to the figures, in which like numerals indicate like parts, and particularly to FIGS. 1 and 2, which arm a diagrammatic top perspective view showing the present invention being a pivotal fold away trailer hitch mount exploded from the mounting place on a typical motor vehicle and an enlarged diagrammatic bottom perspective view of the present invention per se, taken in the direction of arrow 2 in FIG. 1.

The present invention is a pivotal fold away trailer hitch mount 10, which comprises a mounting plate 12 for secureing to an underside of a frame 14 of a motor vehicle 16, and adjacent to a bumper 18 of the motor vehicle 16. A hitch assembly 20 is also provided. A mechanism 22 is for pivotally connecting an inner end of the hitch assembly 18 to a bottom surface 24 of the mounting plate 12. The hitch assembly 20 will swing from a towing position extending outwardly from the bumper 18 of the motor vehicle 16 to a stowed position extending under the frame 14 of the motor vehicle 16 away from the bumper 18. A mechanism 26 is for retaining the hitch assembly 20 in the towing position, while another mechanism 28 is for holding the hitch assembly 20 in the stowed position.

Figure 3:
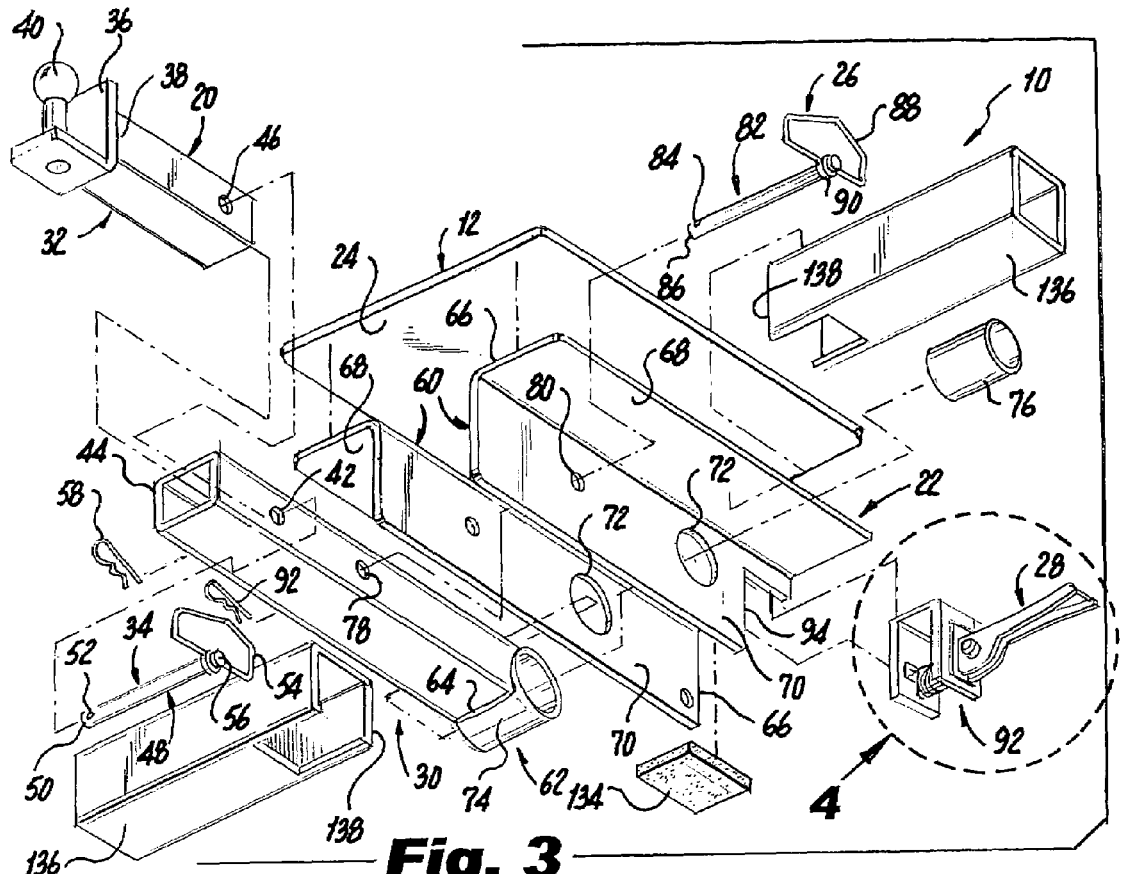
FIG. 3 is an exploded diagrammatic bottom perspective view of the present invention.
Figure 4:
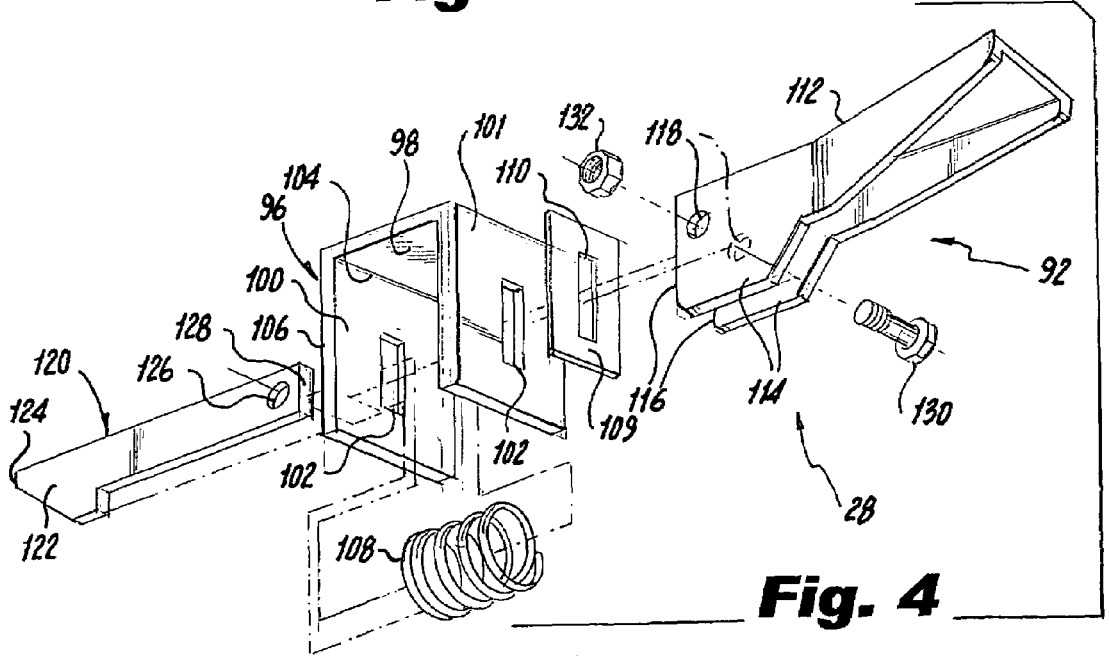
FIG. 4 is an enlarged diagrammatic bottom perspective view of the latch mechanism shown enclosed in the dotted circle indicated by arrow 4 in FIG. 3.

The various components of the present invention are best shown in FIG. 3 through FIG. 8 and as such, will be discussed with reference thereto. FIG. 3 is an exploded diagrammatic bottom perspective view of the present invention. FIG. 4 is an enlarged diagrammatic bottom perspective view of the latch mechanism shown enclosed in the dotted circle indicated by arrow 4 in FIG. 3.

Figure 5:
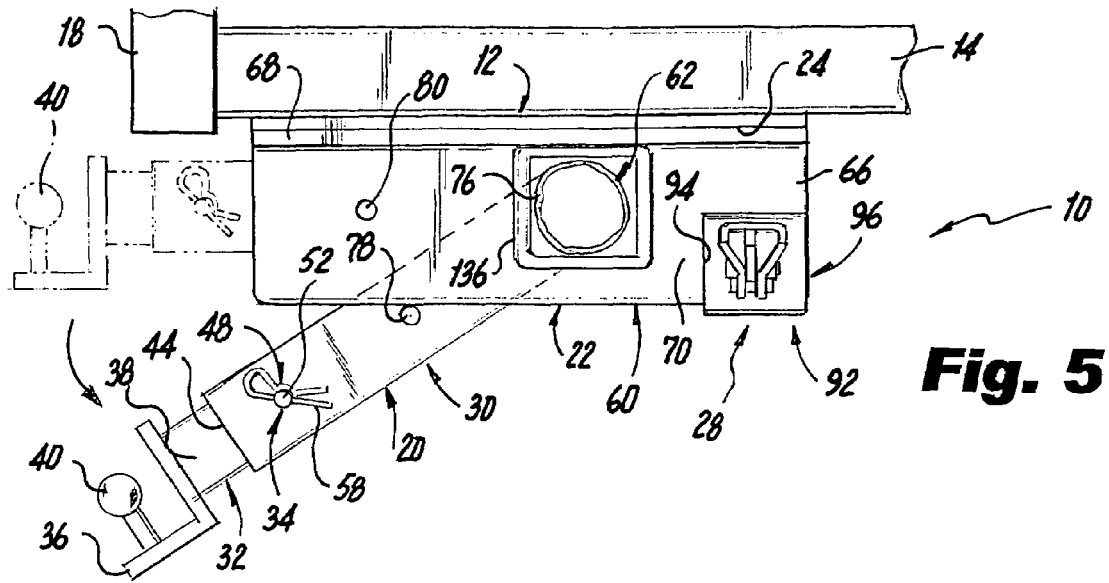
FIG. 5 is a diagrammatic side elevational view taken in the direction of arrow 5 in FIG. 2 of the present invention mounted under the motor vehicle, with the hitch assembly in phantom in the towing position and in solid lines moved to an intermediate state for a stowed position.
Figure 6:
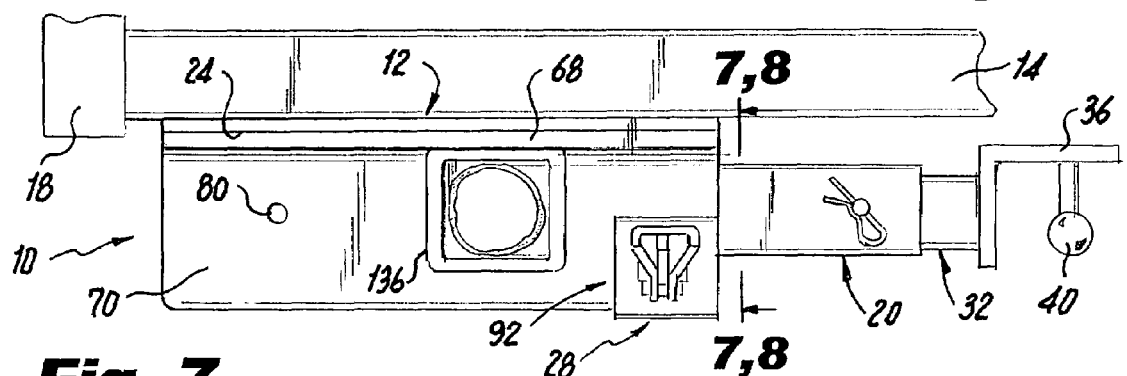
FIG. 6 is a diagrammatic side elevational view taken in the direction of arrow 6 in FIG. 2 of the present invention mounted under the motor vehicle with the hitch assembly in the stowed position.

FIG. 5 is a diagrammatic side elevational view taken in the direction of arrow 5 in FIG. 2 of the present invention mounted under the motor vehicle, with the hitch assembly in phantom in the towing position and in solid lines moved to an intermediate state for a stowed position. FIG. 6 is a diagrammatic side elevational view taken in the direction of arrow 6 in FIG. 2 of the present invention mounted under the motor vehicle with the hitch assembly in the stowed position.

Figure 7:
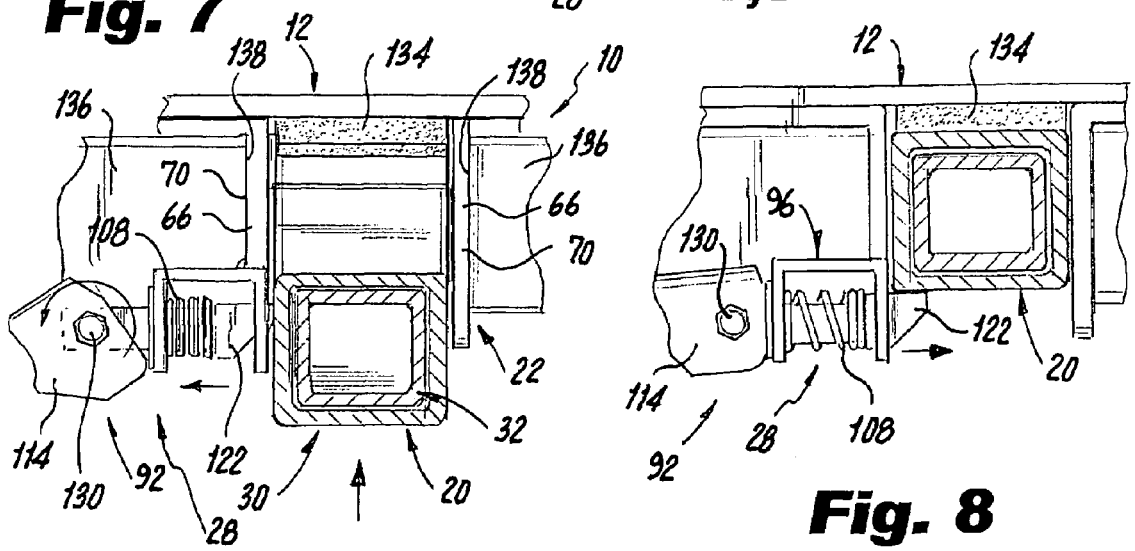
FIG. 7 is a diagrammatic cross sectional view, with parts broken away, taken on line 7-7 of FIG. 6 slightly before the hitch assembly is placed in the stowed position.
Figure 8:
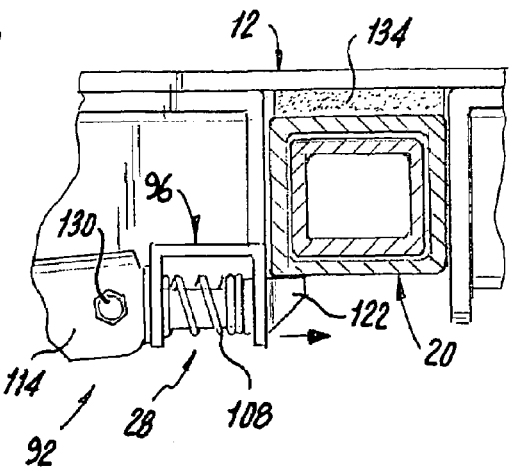
FIG. 8 is a diagrammatic cross sectional view, with parts broken away, taken on line 8-8 of FIG. 6 after the hitch assembly is placed in the stowed position.

FIG. 7 is a diagrammatic cross sectional view, with parts broken away, taken on line 7-7 of FIG. 6 slightly before the hitch assembly is placed in the stowed position. FIG. 8 is a diagrammatic cross sectional view, with parts broken away, taken on line 8-8 of FIG. 6 after the hitch assembly is placed in the stowed position.

The hitch assembly 20 comprises a hollow receiver arm 30, a shaft 32 telescopically inserted within the hollow receiver arm 30 and a mechanism 34 for securing the shaft 32 within the hollow receiver arm 30. The hitch assembly 20 further comprises a fitting 36 affixed onto an outer end 38 of the shaft 32 and a trailer hitch towing ball 40 mounted on the fitting 36.

The securing mechanism 34 comprises the hollow receiver arm 30 of the hitch assembly 20 having a pair of coaxially aligned bores 42 near an outer end 44. The shaft 32 of the hitch assembly 20 has a transverse bore 46 therethrough. A retainer pin 48 has a transverse hole 50 through a first end 52 and a pull handle 54 on a second end 56 of the retainer pin 48. The retainer pin 48 extends through the coaxially aligned bores 42 in the hollow receiver arm 30 and the transverse bore 46 in the shaft 32, with the first end 50 of the retainer pin 48 extending outwardly therefrom. A linchpin 58 is inserted through the transverse hole 50 in the first end 52 of the retainer pin 48, to prevent accidental removal of the retainer pin 48.

The pivotally connecting mechanism 22 comprises a bracket assembly 60 affixed to the bottom surface 24 of the mounting plate 12. A hinge assembly 62 is coupled between an inner end 64 of the hollow receiver arm 30 of the hitch assembly 20 and near a rear end of the bracket assembly 60.

The bracket assembly 60 consists of a pair of L-shaped members 66. Each L-shaped member 66 includes a first flange 68 and a second flange 70. The first flanges 68 of the pair of L-shaped members 66 are affixed to the bottom surface 24 of the mounting plate 12 with the second flanges 70 of the pair of L-shaped members 66 spaced apart and facing each other.

The hinge assembly 62 comprises the second flanges 70 of the pair of L-shaped members 66 of the bracket assembly 60, each having a coaxially aligned pivot aperture 72 near a rear end. A hinge sleeve 74 is attached to the inner end 64 of the hollow receiver arm 30 of the hitch assembly 20. A cylindrical pivot member 76 is inserted through the hinge sleeve 74, with each end of the cylindrical pivot member 76 attached to one coaxially aligned pivot aperture 72 in each second flange 70 of the pair of L-shaped members 66, thereby allowing the hinge sleeve 74 to pivot on the cylindrical pivot member 76.

The retaining mechanism 26 consists of the hollow receiver arm 30 of the hitch assembly 20 having a second pair of coaxially aligned bores 78 located between the first pair of coaxially aligned bores 42 and the inner end 64 thereof. The second flanges 70 of the pair of L-shaped members 66 of the bracket assembly 60 have coaxially aligned bores 80 located forward from the coaxially aligned pivot apertures 72. A second retainer pin 82 has a transverse hole 84 through a first end 86 and a pull handle 88 on a second end 90 of the second retainer pin 82. The second retainer pin 82 extends through the coaxially aligned bores 80 in the second flanges 70 of the pair of L-shaped members 66 and the second pair of coaxially aligned bores 78 in the hollow receiver arm 30, with the first end 86 of the second retainer pin 82 extending outwardly therefrom when the hitch assembly 20 is placed in the towing position. A second linchpin 92 is inserted through the transverse hole 84 in the first end 86 of the second retainer pin 82, to prevent accidental removal of the second retainer pin 82, when the hitch assembly 20 is in the towing position.

The holding mechanism 28 comprises a latch mechanism 92 mounted onto a rear end of the first flange 68 of one L-shaped member 66 of the bracket assembly 60. When the hitch assembly 20 swings into the stowed position, the latch mechanism 92 will hold the hollow receiver arm 30 of the hitch assembly 20 between the second flanges 70 of the pair of L-shaped members 66 of the bracket assembly 60 in the stowed position.

The latch mechanism 92 consists of the first flange 70 of one L-shaped member 66 having an L-shaped cut-out area 94 at the rear end. A U-shaped structure 96 has a base wall 98 and a pair of side walls 100, 101 extending from the base wall 98. The side walls 100, 101 have coaxially aligned slots 102. The U-shaped structure 96 is inverted with one corner 104 of the base wall 98 and an edge 106 of the first side wall 100 affixed onto the L-shaped cut-out area 94 on the rear end of the first flange 70 of one L-shaped member 66. A coil spring 108 is inserted between the side walls 100, 101 of the U-shaped structure 96. A cam plate 109 has a slot 110 therethrough. The cam plate 109 is placed against the second side wall 101 of the U-shaped structure 96 with the slot 110 of the cam plate 109 in alignment with the slot 102 in the second side wall 101.

A handle 112 has a pair of arms 114 with curved free ends 116. The arms 114 have coaxially aligned holes 118 therethrough. A latch bar 120 has a notched head 122 on an outer end 124 and a transverse aperture 126 through an inner end 128. The inner end 128 of the latch bar 120 is inserted through the coaxially aligned slots 102 in the side walls 100, 101 in the U-shaped structure 96, past the coil spring 108, the slot 110 in the cam plate 109 and between the arms 114 of the handle 112 until the notched head 122 on the outer end 124 of the latch bar bears against one side of the coil spring 108. A bolt 130 is inserted through the coaxially aligned holes 118 in the arms 114 of the handle 112 and the transverse aperture 126 in the inner end 128 of the latch bar 120. A nut 132 is threaded onto the bolt 130. The notched head 122 of the latch bar 120 is normally biased outwardly from the U-shaped structure 96 by the coil spring 108 to hold the hitch assembly 20 in the stowed position. When the handle 112 is turned downwardly, the curved free ends 116 of the arms 114 of the handle 112 will bear against the cam plate 109, to pull the notched head 122 of the latch bar 120 inwardly in the U-shaped structure 96 to release the hitch assembly 20.

An optional compressible pad 134 is secured onto the bottom surface 24 of the mounting plate 12 between the second flanges 70 of the pair of L-shaped members 66 of the bracket assembly 60. When the hitch assembly 20 swings to the stowed position, the hitch assembly 20 will make contact with the compressible pad member 134 to prevent the hitch assembly 20 from rattling under the frame 14 of the motor vehicle 16. A pair of hollow rectangular reinforcement members 136 are also provided. Each reinforcement member 136 is mounted at one end 138 to the first flange 68 and the second flange 70 of each L-shaped member 66 at one pivot aperture 72. The pair of hollow rectangular reinforcement members 136 will add stability and strength thereto.

It will be understood that each of the elements described above, or two or more together, may also find a useful application in other types of constructions differing from the types described above.

While the invention has been illustrated and described as embodiments of a pivotal foldaway trailer hitch mount, accordingly it is not limited to the details shown, since it will be understood that various omissions, modifications, substitutions and changes in the forms and details of the device illustrated and its operation can be made by those skilled in the art without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute characteristics of the generic or specific aspects of this invention.

The invention claimed is:

1. A pivotal fold away trailer hitch mount which comprises:
    a) a mounting plate for securing to an underside of a frame of a motor vehicle, and adjacent to a bumper of the motor vehicle;
    b) a hitch assembly;
    c) means for pivotally connecting an inner end of said hitch assembly to a bottom surface of said mounting plate, so that said hitch assembly will swing from a towing position extending outwardly from the bumper of the motor vehicle to a stowed position extending under the frame of the motor vehicle away from the bumper;
    d) means for retaining said hitch assembly in the towing position;
    e) means for holding said hitch assembly in the stowed position;
    wherein said hitch assembly comprises:
    f) a hollow receiver arm;
    g) a shaft telescopically inserted within said hollow receiver arm;
    h) means for securing said shaft within said hollow receiver arm;
    wherein said securing means comprises:
    i) said hollow receiver arm of said hitch assembly having a pair of coaxially aligned bores near an outer end;
    j) said shaft of said hitch assembly having a transverse bore therethrough;
    k) a retainer pin having a transverse hole through a first end and a pull handle on a second end of said retainer pin, wherein said retainer pin extends through said coaxially aligned bores in said hollow receiver arm and said transverse bore in said shaft, with said first end of said retainer pin extending outwardly therefrom; and
    l) a linchpin inserted through said transverse hole in said first end of said retainer pin, to prevent accidental removal of said retainer pin;
    wherein said pivotally connecting means comprises:
    m) a bracket assembly affixed to said bottom surface of said mounting plate;
    n) a hinge assembly coupled between an inner end of said hollow receiver arm of said hitch assembly and near a rear end of said bracket assembly;
    wherein said bracket assembly comprises a pair of L-shaped members, in which each said L-shaped member includes a first flange and a second flange, wherein said first flanges of said pair of L-shaped members are affixed to said bottom surface of said mounting plate, with said second flanges of said pair of L-shaped members spaced apart and facing each other;
    wherein said hinge assembly comprises:
    o) said second flanges of said pair of L-shaped members of said bracket assembly, each having a coaxially aligned pivot aperture near a rear end;
    p) a hinge sleeve attached to said inner end of said hollow receiver arm of said hitch assembly; and
    q) a cylindrical pivot member inserted through said hinge sleeve, with each end of said cylindrical pivot member attached to one said coaxially aligned pivot aperture in each said second flange of said pair of L-shaped members, thereby allowing said hinge sleeve to pivot on said cylindrical pivot member.

2. The trailer hitch mount as recited in claim 1, wherein said hitch assembly further comprising:
    a) a fitting affixed onto an outer end of said shaft; and
    b) a trailer hitch towing ball mounted on said fitting.

3. The trailer hitch mount as recited in claim 1, wherein said retaining means comprises:
    a) said hollow receiver arm of said hitch assembly having a second pair of coaxially aligned bores located between said first pair of coaxially aligned bores and said inner end thereof;
    b) said second flanges of said pair of L-shaped members of said bracket assembly having coaxially aligned bores located forward from said coaxially aligned pivot apertures;
    c) a second retainer pin having a transverse hole through a first end and a pull handle on a second end of said second retainer pin, wherein said second retainer pin extends through said coaxially aligned bores in said second flanges of said pair of L-shaped members and said second pair of coaxially aligned bores in said hollow receiver arm, with said first end of said second retainer pin extending outwardly therefrom when said hitch assembly is placed in the towing position; and
    d) a second linchpin inserted through said transverse hole in said first end of said second retainer pin, to prevent accidental removal of said second retainer pin, when said hitch assembly in the towing position.

4. The trailer hitch mount as recited in claim 1, wherein said holding means comprises a latch mechanism mounted onto a rear end of said first flange of one said L-shaped member of said bracket assembly, wherein when said hitch assembly swings into the stowed position said latch mechanism will hold said hollow receiver arm of said hitch assembly between said second flanges of said pair of L-shaped members of said bracket assembly in the stowed position.

5. The trailer hitch mount as recited in claim 4, wherein said latch mechanism comprises:
   a) said first flange of one said L-shaped member having an L-shaped cut-out area at said rear end;
   b) a U-shaped structure having a base wall and a pair of side walls extending from said base wall, in which said side walls have coaxially aligned slots, wherein said U-shaped structure is inverted with one corner of said base wall and an edge of said first side wall affixed onto said L-shaped cut-out area on said rear end of said first flange of one said L-shaped member;
   c) a coil spring inserted between said side walls of said U-shaped structure;
   d) a cam plate having a slot therethrough, said cam plate placed against said second side wall of said U-shaped structure with said slot of said cam plate in alignment with said slot in said second side wall;
   e) a handle having a pair of arms with curved free ends, said arms having coaxially aligned holes therethrough;
   f) a latch bar having a notched head on an outer end and a transverse aperture through an inner end, said inner end of said latch bar inserted through said coaxially aligned slots in said side walls in said U-shaped structure, past said coil spring, said slot in said cam plate and between said arms of said handle, until said notch head on said outer end of said latch bar bears against one side of said coil spring;
   g) a bolt inserted through said coaxially aligned holes in said arms of said handle and said transverse aperture in said inner end of said latch bar; and
   h) a nut threaded onto said bolt, whereby said notched head of said latch bar is normally biased outwardly from said U-shaped structure by said coil spring to hold said hitch assembly in the stowed position until said handle is turned downwardly, so that said curved free ends of said arms of said handle will bear against said cam plate, to pull said notched head of said latch bar inwardly in said U-shaped structure to release said hitch assembly.

6. A pivotal fold away trailer hitch mount which comprises:
   a) a mounting plate for securing to an underside of a frame of a motor vehicle, and adjacent to a bumper of the motor vehicle;
   b) a hitch assembly;
   c) means for pivotally connecting an inner end of said hitch assembly to a bottom surface of said mounting plate, so that said hitch assembly will swing from a towing position extending outwardly from the bumper of the motor vehicle to a stowed position extending under the frame of the motor vehicle away from the bumper;
   d) means for retaining said hitch assembly in the towing position;
   e) means for holding said hitch assembly in the stowed position; wherein said hitch assembly comprises:
   f) a hollow receiver arm;
   g) a shaft telescopically inserted within said hollow receiver arm;
   h) means for securing said shaft within said hollow receiver arm; wherein said securing means comprises:
   i) said hollow receiver arm of said hitch assembly having a pair of coaxially aligned bores near an outer end;
   j) said shaft of said hitch assembly having a transverse bore therethrough;
   k) a retainer pin having a transverse hole through a first end and a pull handle on a second end of said retainer pin, wherein said retainer pin extends through said coaxially aligned bores in said hollow receiver arm and said transverse bore in said shaft, with said first end of said retainer pin extending outwardly therefrom; and
   l) a linchpin inserted through said transverse hole in said first end of said retainer pin, to prevent accidental removal of said retainer pin; wherein said pivotally connecting means comprises:
   m) a bracket assembly affixed to said bottom surface of said mounting plate;
   n) a hinge assembly coupled between an inner end of said hollow receiver arm of said hitch assembly and near a rear end of said bracket assembly; wherein said bracket assembly comprises a pair of L-shaped members, in which each said L-shaped member includes a first flange and a second flange, wherein said first flanges of said pair of L-shaped members are affixed to said bottom surface of said mounting plate, with said second flanges of said pair of L-shaped members spaced apart and facing each other; further comprising a compressible pad member secured onto said bottom surface of said mounting plate between said second flanges of said pair of L-shaped members of said bracket assembly, wherein when said hitch assembly swings to the stowed position, said hitch assembly will make contact with said compressible pad member to prevent said hitch assembly from rattling under the frame of the motor vehicle.

7. The trailer hitch mount as recited in claim 1, further comprising a pair of hollow rectangular reinforcement members, each said reinforcement member mounted at one end to said first flange and said second flange of each said L-shaped member at one said pivot aperture, wherein said pair of hollow rectangular reinforcement members will add stability and strength thereto.

* * * * *